(12) United States Patent
Bobel et al.

(10) Patent No.: US 11,421,310 B2
(45) Date of Patent: Aug. 23, 2022

(54) HIGH STRENGTH ALUMINUM ALLOY

(71) Applicant: GM GLOBAL TECHNOLOGY OPERATIONS LLC, Detroit, MI (US)

(72) Inventors: Andrew C. Bobel, Clinton Township, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 16/163,141

(22) Filed: Oct. 17, 2018

(65) Prior Publication Data

US 2020/0123640 A1 Apr. 23, 2020

(51) Int. Cl.
| | |
|---|---|
| *C22F 1/053* | (2006.01) |
| *C22C 21/10* | (2006.01) |
| *B33Y 10/00* | (2015.01) |
| *B33Y 70/00* | (2020.01) |
| *B22F 10/20* | (2021.01) |

(52) U.S. Cl.
CPC .............. *C22F 1/053* (2013.01); *B22F 10/20* (2021.01); *B33Y 10/00* (2014.12); *B33Y 70/00* (2014.12); *C22C 21/10* (2013.01); *B22F 2301/052* (2013.01)

(58) Field of Classification Search
CPC .. C22F 1/053; B22F 3/1055; B22F 2301/052; B33Y 10/00; B33Y 70/00; B33Y 80/00; C22C 21/10; C22C 1/0416; Y02P 10/25
USPC ......................................................... 148/700
See application file for complete search history.

(56) References Cited

U.S. PATENT DOCUMENTS

| | | | |
|---|---|---|---|
| 5,902,943 A | * | 5/1999 | Schaffer .................. C22C 32/00 75/249 |
| 10,682,699 B2 | | 6/2020 | Martin et al. |
| 2019/0032175 A1 | | 1/2019 | Martin et al. |
| 2019/0040503 A1 | | 2/2019 | Martin et al. |

OTHER PUBLICATIONS

T. Marlaud, et al., Influence of alloy composition and heat treatment on precipitate composition in Al—Zn—Mg—Cu alloys, Acta Materialia, vol. 58, Issue 1, 2010, pp. 248-260. (Year: 2010).*

(Continued)

*Primary Examiner* — Rebecca Janssen
(74) *Attorney, Agent, or Firm* — Quinn IP Law

(57) ABSTRACT

A precipitation hardenable aluminum alloy is disclosed along with a precipitation hardened form of the aluminum alloy and a method of manufacturing an aluminum alloy article from the precipitation hardenable aluminum alloy. The disclosed precipitation hardenable aluminum alloy has a composition that includes, on a weight percent (wt %) basis, 8%-13% zinc, 1.5%-5% magnesium, 0%-5% copper, 0%-2% of zirconium, chromium, or zirconium and chromium in total, and the balance aluminum with no more than 0.5% impurities. The alloy composition is adaptable to a wide range of manufacturing processes including additive manufacturing. The composition of the aluminum alloy also enables the dispersion of strengthening precipitate phases selected from an η-phase precipitate, a θ-phase precipitate, and a T-phase precipitate, while being free of a S-phase precipitate, when precipitation hardened.

19 Claims, 3 Drawing Sheets

(56) References Cited

OTHER PUBLICATIONS

Davis, Aluminum and Aluminum Alloys, ASM international, 2001 (Year: 2001).*
Martin, et al., "3D printing of high-strength aluminum alloys", Nature, Sep. 2017, vol. 549, pp. 365-370.
Bobel et al., U.S. Appl. No. 15/934,342 entitled "Aluminum Alloy Powders for Powder Bed Fusion Additive Manufacturing Processes," filed Mar. 23, 2018.

* cited by examiner

HIGH STRENGTH ALUMINUM ALLOY

INTRODUCTION

Aluminum alloys can achieve a wide range of properties (e.g., strength, ductility, electrical conductivity, weldability, corrosion resistance, etc.) depending on their alloy composition and whether or not they are thermally or mechanically treated. 7000 series aluminum alloys are precipitation hardenable alloys that include zinc as a primary alloying element and, additionally, may include magnesium as a secondary alloying element plus small amounts of one or more other optional elements such as copper, manganese, zirconium, chromium, and titanium. Precipitation hardened 7000 series aluminum alloys include some of the highest strength aluminum alloys available. In fact, various 7000 series aluminum alloys, most notably 7050 and 7075 aluminum alloys, are good candidates for the manufacture highly stressed parts for the aerospace and automotive industries. For example, in the automotive industry, 7000 series aluminum alloys are often considered for the manufacture of turbocharger and supercharger compressor wheels as well as reciprocating components that are not exposed to high temperatures.

A shortcoming of 7000 series aluminum alloys is that they are not conducive to additive manufacturing. Additive manufacturing, in general, is a computer-aided manufacturing process in which a three-dimensional article is built microlayer by microlayer to its final geometric shape using digital design data to coordinate the process. When used to fabricate metal or alloy articles, additive manufacturing typically involves fusing together many microlayers of the metal or alloy in succession until the final article is fully fabricated. Several known variations of such metal- or alloy-based additive manufacturing include powder bed fusion techniques (e.g., SLS, SLM, EBM) and direct energy deposition techniques (e.g., LENS). Each of these additive manufacturing techniques, when applied to 7000 series aluminum alloys, involves sintering, partially melting, or melting the aluminum alloy, typically in powder or wire form, many times in succession to build the desired article one microlayer at a time. However, when subjected to this type of process, 7000 series aluminum alloys tend to experience dendritic and epitaxial grain growth, resulting in columnar grains that nucleate up through the many microlayers as the article is being built. As the developing article is continuously thermally cycled with the addition of each microlayer, residual stresses can develop, which oftentimes causes the unfinished article to crack under its own weight along the columnar grains unless ex-situ nucleants are added to the alloy.

A 7000 series type aluminum alloy is disclosed herein that can endure additive manufacturing procedures unlike conventional 7000 series aluminum alloys. The disclosed aluminum alloy includes aluminum as a main base metal and further includes zinc, magnesium, and optionally copper as constituent alloy elements. The aluminum alloy may also include chromium and/or zirconium as constituent alloy elements along with trace amounts of industry-accepted impurities. The composition of the disclosed aluminum alloy has been specifically designed to have a modified crack susceptibility coefficient that indicates the alloy can tolerate additive manufacturing without cracking. The disclosed aluminum alloy is thus uniquely suitable for fabricating articles by additive manufacturing, although it may certainly be used to fabricate articles by other manufacturing practices as well. Additionally, the disclosed aluminum alloy can be precipitation hardened to achieve a high strength by selectively maximizing certain precipitate phases, and avoiding others, during heat treatment of the alloy, regardless of whether the aluminum alloy has been formed into an article by additive manufacturing or by some other manufacturing practice including conventional subtractive manufacturing.

SUMMARY OF THE DISCLOSURE

A precipitation hardenable aluminum alloy according to embodiments of the present disclosure has a composition comprising 8 wt % to 13 wt % zinc; 1.5 wt % to 5 wt % magnesium; 0 wt % to 5 wt % copper; 0 wt % to 2 wt % zirconium, chromium, or zirconium and chromium in total; and balance aluminum with no more than 0.5 wt % impurities. The precipitation hardenable aluminum alloy may has a modified cracking susceptibility coefficient (mCSC) of 70 or less. The modified cracking susceptibility coefficient is defined by equation (1)

$$mCSC = (CSC)(dT) \tag{1}$$

wherein CSC is a standard cracking coefficient of the aluminum alloy and dT is a freezing range of the aluminum alloy. The CSC is further defined by equation (2)

$$CSC = \frac{(t'_{Lf0.01} - t'_{Lf0.1})}{(t'_{Lf0.1} - t'_{Lf0.6})} \tag{2}$$

wherein, in relation to the aluminum alloy solidifying from 100% liquid to 100% solid as depicted on a liquid fraction versus time fraction curve, $t'_{Lf0.01}$ is a time fraction associated with a liquid fraction of 0.01, $t'_{Lf0.1}$ is a time fraction associated with a liquid fraction of 0.1, and $t'_{Lf0.6}$ is a time fraction associated with a liquid fraction of 0.6, and dT is further defined as a difference between a temperature at which aluminum atoms begin to assemble into their primary face centered cubic (FCC) crystal unit cell structures and a temperature at which there is no more liquid remaining in the aluminum alloy. The dT is reported in degrees Celsius. In other implementations, the mCSC of the precipitation hardenable aluminum alloy may be less than 60, less than 40, or even less than 30.

The precipitation hardenable aluminum alloy may include a low copper content or a high copper content. In the low copper content version, the precipitation hardenable aluminum alloy has a composition that comprises 8.5 wt % to 12.5 wt % zinc; 2 wt % to 4.5 wt % magnesium; 0 wt % to 1 wt % copper; 0 wt % to 0.5 wt % zirconium, chromium, or zirconium and chromium in total; and balance aluminum with no more than 0.2 wt % impurities. For example, the precipitation hardenable aluminum alloy with a low copper content may have a composition that comprises 11.5 wt % to 12.5 wt % zinc; 3 wt % to 4 wt % magnesium; 0 wt % to 0.2 wt % copper; 0 wt % to 0.3 wt % zirconium, chromium, or zirconium and chromium in total; and balance aluminum with no more than 0.1 wt % impurities. In another example, the precipitation hardenable aluminum alloy with a low copper content may have a composition that comprises 8.5 wt % to 9.5 wt % zinc; 3 wt % to 4 wt % magnesium; 0.5 wt % to 1 wt % copper; 0 wt % to 0.3 wt % zirconium, chromium, or zirconium and chromium in total; and balance aluminum with no more than 0.1 wt % impurities. In the high copper content version, the precipitation hardenable aluminum alloy has a composition that comprises 8 wt % to 10 wt % zinc; 1 wt % to 3 wt % magnesium; 3 wt % to 5 wt % copper; 0 wt % to 0.5 wt % zirconium, chromium, or zirconium and chromium in total; and balance aluminum with no more than 0.2 wt % impurities. For example, the precipitation hardenable aluminum alloy with a high copper content may have a composition that comprises 8.5 wt % to 9.5 wt % zinc; 1.5 wt % to 2.5 wt % magnesium; 3.5 wt % to 4.5 wt % copper; 0 wt % to 0.3 wt % zirconium, chromium, or zirconium and chromium in total; and balance aluminum with no more than 0.1 wt % impurities.

The precipitation hardenable aluminum alloy may be precipitation hardened in a heat treatment method that includes several steps. One step of the method involves solution treating the precipitation hardenable aluminum alloy by heating the alloy to a temperature above its solvus temperature but below its solidus temperature to achieve a homogeneous solid solution of the alloy composition. Another step of the method involves quenching the precipitation hardenable aluminum alloy to form a supersaturated solution of the alloy composition. And yet another step of the method involves aging the precipitation hardenable aluminum alloy to produce fine dispersion of precipitates within an aluminum matrix. The dispersion of precipitates includes one or more strengthening precipitate phases selected from an η-phase precipitate, a θ-phase precipitate, and a T-phase precipitate, while being free of a S-phase precipitate.

A precipitation hardened aluminum alloy is also disclosed. The precipitation hardened aluminum alloy according to embodiments of the present disclosure has a composition comprising 8 wt % to 13 wt % zinc; 1.5 wt % to 5 wt % magnesium; 0 wt % to 5 wt % copper; 0 wt % to 2 wt % zirconium, chromium, or zirconium and chromium in total; and balance aluminum with no more than 0.5 wt % impurities. Additionally, the precipitation hardened aluminum alloy includes an aluminum matrix and a fine dispersion of precipitates within the aluminum matrix. The fine dispersion of precipitates includes one or more strengthening precipitate phases selected from an η-phase precipitate, a θ-phase precipitate, and a T-phase precipitate, while being free of a S-phase precipitate. In one implementation, a phase fraction of the one or more strengthening precipitate phases in the alloy is greater than 10 mol %. For example, the fine dispersion of precipitates may include the η-phase precipitate and a phase fraction of the η-phase precipitate in the alloy may be greater than 10 mol %. In another example, the fine dispersion of precipitates may include the η-phase precipitate and the θ-phase precipitate and a phase fraction of the η-phase precipitate and the θ-phase precipitate in combination in the alloy being greater than 10 mol %. And, in yet another example, the fine dispersion of precipitates may include the η-phase precipitate and the T-phase precipitate and a phase fraction of the η-phase precipitate and the T-phase precipitate in combination in the alloy being greater than 10 mol %.

The precipitation hardened aluminum alloy may has a modified cracking susceptibility coefficient (mCSC) of 70 or less. The modified cracking susceptibility coefficient is defined by equation (1)

$$mCSC = (CSC)(dT) \qquad (1)$$

wherein CSC is a standard cracking coefficient of the aluminum alloy and dT is a freezing range of the aluminum alloy. The CSC is further defined by equation (2)

$$CSC = \frac{(t'_{Lf0.01} - t'_{Lf0.1})}{(t'_{Lf0.1} - t'_{Lf0.6})} \qquad (2)$$

wherein, in relation to the aluminum alloy solidifying from 100% liquid to 100% solid as depicted on a liquid fraction versus time fraction curve, $t'_{Lf0.01}$ is a time fraction associated with a liquid fraction of 0.01, $t'_{Lf0.1}$ is a time fraction associated with a liquid fraction of 0.1, and $t'_{Lf0.6}$ is a time fraction associated with a liquid fraction of 0.6, and dT is further defined as a difference between a temperature at which aluminum atoms begin to assemble into their primary face centered cubic (FCC) crystal unit cell structures and a temperature at which there is no more liquid remaining in the aluminum alloy. The dT is reported in degrees Celsius.

The precipitation hardened aluminum alloy may include a low copper content or a high copper content. In the low copper content version, the precipitation hardened aluminum alloy has a composition that comprises 8.5 wt % to 12.5 wt % zinc; 2 wt % to 4.5 wt % magnesium; 0 wt % to 1 wt % copper; 0 wt % to 0.5 wt % zirconium, chromium, or zirconium and chromium in total; and balance aluminum with no more than 0.2 wt % impurities. In the high copper content version, the precipitation hardened aluminum alloy has a composition that comprises 8 wt % to 10 wt % zinc; 1 wt % to 3 wt % magnesium; 3 wt % to 5 wt % copper; 0 wt % to 0.5 wt % zirconium, chromium, or zirconium and chromium in total; and balance aluminum with no more than 0.2 wt % impurities.

A method of manufacturing an aluminum alloy article is also disclosed and includes several steps. One step of the method involves providing a precipitation hardenable aluminum alloy having a composition that comprises 8 wt % to 13 wt % zinc, 1.5 wt % to 5 wt % magnesium, 0 wt % to 5 wt % copper, 0 wt % to 2 wt % zirconium, chromium, or zirconium and chromium in total, and the balance aluminum with no more than 0.5 wt % impurities. Another step of the method involves building an aluminum alloy article from the precipitation hardenable aluminum alloy by way of additive manufacturing in which a microlayer fusion cycle is repeatedly performed to fuse a plurality of microlayers of the precipitation hardenable aluminum alloy together. Each of the microlayers has a thickness between 5 μm to 100 μm and constitutes a cross-sectional slice of the aluminum alloy article. The microlayer fusion cycle that is repeatedly performed may comprise (1) depositing a layer of powder of the precipitation hardenable aluminum alloy and (2) scanning a portion of the layer of powder of the precipitation hardenable aluminum alloy with a concentrated energy beam to sinter or melt that portion of the layer so that, upon cooling, the portion of the layer of powder of the precipitation hardenable aluminum alloy that is sintered or melted by the concentrated energy beam solidifies into a microlayer of the aluminum alloy article. Additionally, the method may further comprise heat treating the precipitation hardenable aluminum alloy that constitutes the aluminum alloy article to produce a fine dispersion of precipitates within an aluminum matrix of the aluminum alloy. The fine dispersion of precipitates includes one or more strengthening precipitate phases selected from an η-phase precipitate, a θ-phase precipitate, and a T-phase precipitate, while being free of a S-phase precipitate.

DETAILED DESCRIPTION

Figure 1:
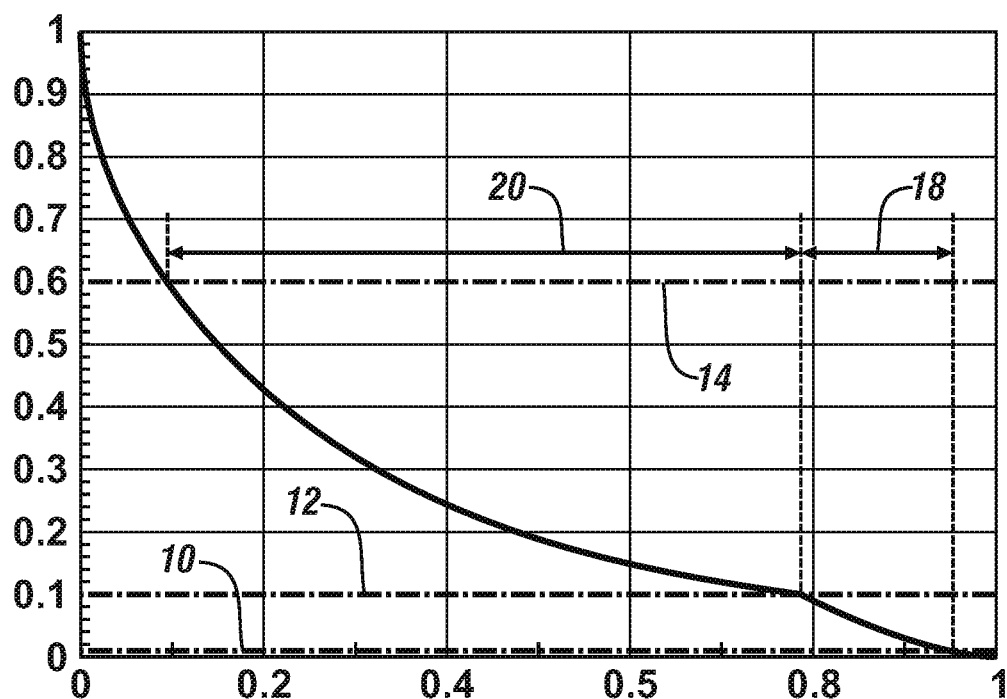
FIG. 1 is a general and representative liquid fraction (x-axis) versus time fraction (y-axis) curve (Lf-t' curve) for a solidifying precipitation hardenable aluminum alloy according to the present disclosure for use in determining the standard cracking susceptibility coefficient of the aluminum alloy.

A precipitation hardenable aluminum alloy is disclosed along with a precipitation hardened form of the aluminum alloy and a method of manufacturing an aluminum alloy article from the precipitation hardenable aluminum alloy. The disclosed precipitation hardenable aluminum alloy has a composition that includes, on a weight percent (wt %) basis, 8% to 13% zinc, 1.5% to 5% magnesium, 0% to 5% copper, 0% to 2% of zirconium, chromium, or zirconium and chromium in total, and the balance aluminum with no more than 0.5% impurities. The alloy composition is adaptable to a wide range of manufacturing processes including additive manufacturing. The aluminum alloy is compatible with additive manufacturing since its composition has been specifically formulated to provide the alloy with a modified cracking susceptibility coefficient below a certain threshold value that has been determined to be good predictor of whether an alloy can endure thermal stresses that accompany additive manufacturing. The composition of the aluminum alloy also enables the dispersion of certain strengthening precipitate phases to be favored, while other non-strengthening precipitate phases are avoided, when the alloy is heat treated to effectuate precipitation hardening.

The composition of the aluminum alloy may vary within the general compositional ranges recited above. For example, the composition of the aluminum alloy preferably has (1) a low copper content or (2) a high copper content. The composition of the low copper content aluminum alloy includes 8.5 wt % to 12.5 wt % zinc, 2 wt % to 4.5 wt % magnesium, 0 wt % to 1 wt % copper, 0 wt % to 0.5 wt % of zirconium, chromium, or zirconium and chromium in total, and the balance aluminum with no more than 0.2 wt % impurities. In one embodiment, the composition the low copper content aluminum alloy includes 11.5 wt % to 12.5 wt % zinc, 3 wt % to 4 wt % magnesium, 0 wt % to 0.2 wt % copper, 0 wt % to 0.3 wt % of zirconium, chromium, or zirconium and chromium in total, and the balance aluminum with no more than 0.1 wt % impurities. In another embodiment, the composition of the low copper content aluminum alloy includes 8.5 wt % to 9.5 wt % zinc, 3 wt % to 4 wt % magnesium, 0.5 wt % to 1 wt % copper, 0 wt % to 0.3 wt % of zirconium, chromium, or zirconium and chromium in total, and the balance aluminum with no more than 0.1 wt % impurities.

The composition of the high copper content aluminum alloy includes 8 wt % to 10 wt % zinc, 1 wt % to 3 wt % magnesium, 3 wt % to 5 wt % copper, 0 wt % to 0.5 wt % of zirconium, chromium, or zirconium and chromium in total, and the balance aluminum with no more than 0.2 wt % impurities. In one embodiment, the composition of the high copper content aluminum alloy includes 8.5 wt % to 9.5 wt % zinc, 1.5 wt % to 2.5 wt % magnesium, 3.5 wt % to 4.5 wt % copper, 0 wt % to 0.3 wt % of zirconium, chromium, or zirconium and chromium in total, and the balance aluminum with no more than 0.1 wt % impurities. A summary of the general composition of the disclosed precipitation hardenable aluminum alloy along with the compositions and preferred embodiments of the low copper content and high copper content versions of the alloy are shown below in Table 1. In Table 1, the low copper content aluminum alloy is designated "Alloy 1" and the high copper content aluminum alloy is designated "Alloy 2." And, by extension, the two preferred embodiments of the low copper content aluminum alloy set forth above are designated "Alloy 1a" and "Alloy 1b" while the preferred embodiment of the high copper content aluminum alloy set forth above is designated "Alloy 2a."

TABLE 1

Summary of Aluminum Alloy Compositions of the Present Disclosure

| Element (wt %) | General | Alloy 1 | Alloy 1a | Alloy 1b | Alloy 2 | Alloy 2a |
| --- | --- | --- | --- | --- | --- | --- |
| Zn | 8-13 | 8.5-12.5 | 11.5-12.5 | 8.5-9.5 | 8-10 | 8.5-9.5 |
| Mg | 1.5-5 | 2-4.5 | 3-4 | 3-4 | 1-3 | 1.5-2.5 |
| Cu | 0-5 | 0-1 | 0-0.2 | 0.5-1 | 3-5 | 3.5-4.5 |
| Zr, Cr | 0-2 | 0-0.5 | 0-0.3 | 0-0.3 | 0-0.5 | 0-0.3 |
| Al | Bal | Bal | Bal | bal | Bal | bal |
| Others (impurities) | ≤0.5 | ≤0.2 | ≤0.1 | ≤0.1 | ≤0.2 | ≤0.1 |

The composition of the precipitation hardenable aluminum alloy has been devised to provide the alloy with a relatively low modified cracking susceptibility coefficient (mCSC). As mentioned above, the mCSC has been developed to provide a predictive tool for gauging whether an alloy can withstand the thermal cycling inherent in many versions of additive manufacturing without cracking under its own weight while being built microlayer by microlayer. The mCSC is the product of the standard cracking susceptibility coefficient (CSC) and the freezing range (dT) of an alloy, as expressed by the following equation:

$$mCSC = (CSC)(dT)$$

The CSC correlates the crack susceptibility of an alloy to the time during which processes related to crack production may take place and the alloy is most vulnerable to cracking. The freezing range quantifies the extent of the temperatures range over which an alloy freezes. Multiplying these two numerical values (CSC and dT) together to derive the mCSC assigns equal weight to each component to attain a better overall indicator of crack susceptibility during additive manufacturing.

The standard cracking susceptibility coefficient (CSC) is defined as $t_v/t_R$. The values "$t_v$" and "$t_R$" are specific time fraction (t') ranges of the overall solidification process in which an alloy transforms from 100% liquid to 100% solid on a scale from t'=0 (100% liquid) to t'=1 (100% solid) that is normalized with regards to heat flow during the solidification process. The numerator variable, $t_v$, is the time fraction range when the alloy is considered to be vulnerable to cracking, and is calculated as the time fraction range over which the mass fraction of liquid of the solidifying alloy decreases from 10% to 1% ($t'_{Lf0.01} - t'_{Lf0.1}$). The denominator value, $t_R$, is the time fraction range when stress relief processes are considered to be available within the alloy, and is calculated as the time fraction range over which the mass fraction of liquid of the solidifying alloy decreases from 60% to 10% ($t'_{Lf0.1} - t'_{Lf0.6}$). The CSC is, therefore, expressed by the following equation and is unitless:

$$CSC = \frac{t_v}{t_R} = \frac{(t'_{Lf0.01} - t'_{Lf0.1})}{(t'_{Lf0.1} - t'_{Lf0.6})}$$

The time fractions $t'_{Lf0.01}$, $t'_{Lf0.1}$, $t'_{Lf0.6}$ and the corresponding time fraction ranges $t_v$, $t_R$ for a given aluminum alloy can be obtained from a liquid fraction versus time fraction (Lf-t') curve. A representative Lf-t' curve for the disclosed precipitation hardenable aluminum alloy is depicted in FIG. 1. Such curves can be derived by combining information and data from various sources including basic cooling curves of temperature versus time (T-t) and curves of temperature versus liquid fraction (T-Lf), which may be based on experimental data or prepared with software designed to generate multicomponent phase diagrams using, for example, the Scheil solidification model.

Figure 2:
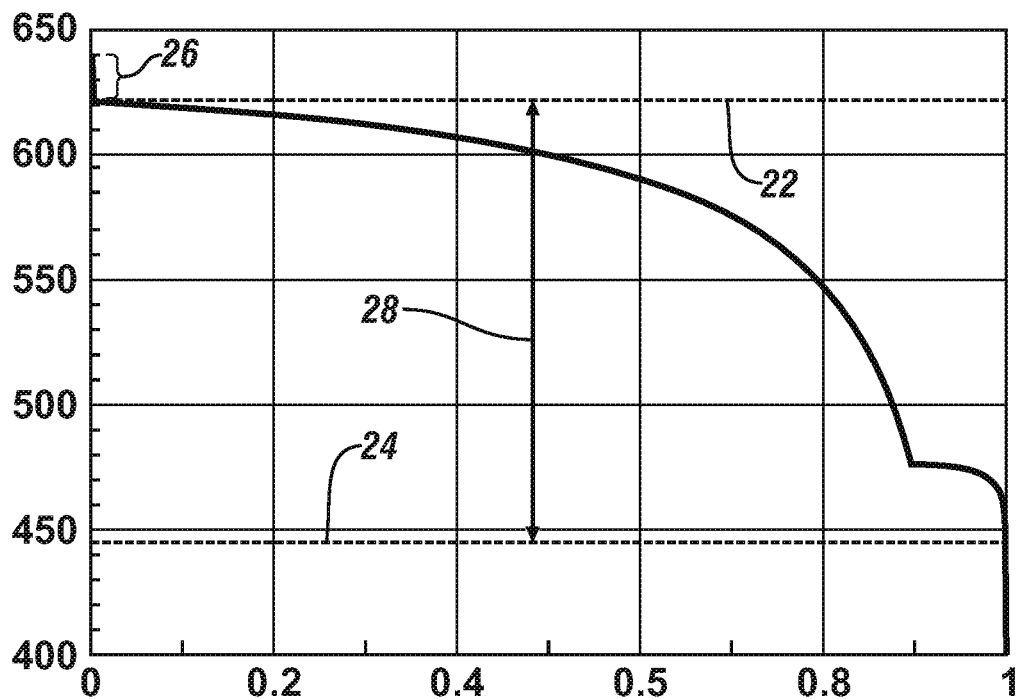
FIG. 2 is a general and representative temperature (° C., x-axis) versus solid fraction (y-axis) curve (T-Sf curve) for a solidifying precipitation hardenable aluminum alloy according to the present disclosure for use in determining a freezing range of the aluminum alloy.

The freezing range (dT) is defined as the temperature range over which freezing occurs and is reported in units of degrees Celsius (° C.). As applicable to aluminum alloys, the freezing range is the difference between the temperature at which aluminum atoms begin to assemble into their primary face centered cubic (FCC) crystal unit cell structures and the temperature at which there is no more liquid remaining in the alloy. Respectively, these two temperatures essentially equate to the temperature of the alloy when the liquid fraction is 0.99 (solid fraction (Sf) 0.01) and the temperature of the alloy when the liquid fraction is 0 (solid fraction is 1). The temperature drop that results from the formation of grain nucleants does not factor into the calculation of the freezing range of the alloy. The freezing range for a given aluminum alloy can be obtained from a temperature versus solid fraction (T-Sf) curve, which, as before, may be based on experimental data or prepared with software designed to generate multicomponent phase diagrams. A representative T-Sf curve for the disclosed precipitation hardenable aluminum alloy is shown in FIG. 2. It should be noted that a T-Lf curve may also be used in lieu of the T-Sf curve to determine the freezing range since the two curves convey the same information albeit with to reference to different interdependent changing states of the alloy.

With specific reference now to FIGS. 1-2, an illustration of how to calculate the mCSC for a given aluminum alloy is provided. Referring to the Lf-t' curve depicted in FIG. 1, the determination of the CSC of the aluminum alloy involves identifying the time fractions $t'_{Lf0.01}$, $t'_{Lf0.1}$, $t'_{Lf0.6}$ that correspond to liquid fractions of 0.01, 0.1, and 0.6 of the solidifying aluminum alloy. In FIG. 1, the liquid fraction of 0.01 (solid fraction of 0.99) is identified by reference numeral 10, the liquid fraction of 0.1 (solid fraction of 0.9) is identified by reference numeral 12, and the liquid fraction of 0.6 (solid fraction of 0.4) is identified by reference numeral 16. The time fractions $t'_{Lf0.01}$, $t'_{Lf0.1}$, $t'_{Lf0.6}$ corresponding to each liquid fraction can be readily determined from those the liquid fraction points on the Lf-t' curve. The vulnerable time fraction range $t_v$ and the relief time fraction range $t_R$ can then be calculated as described above. The vulnerable time fraction range $t_v$ and the relief time fraction range $t_R$ are identified by reference numerals 18 and 20, respectively, in FIG. 1. Once the $t_v$ and $t_R$ values have been determined, the CSC for the aluminum alloy can be calculated by dividing the vulnerable time fraction range $t_v$ by the relief time fraction range $t_R$.

Referring now to the T-Sf curve depicted in FIG. 2, the determination of the freezing range (dT) of the given aluminum alloy involves identifying the temperature that corresponds to the initiation of FCC crystal unit cell structures of aluminum in the alloy, which for the sake of simplification can be assumed to correspond with a liquid fraction of 0.99, and the temperature that corresponds to a liquid fraction of 0. The former temperature ($T_{Lf0.99}$) is identified by reference numeral 22 in FIG. 2 and the latter temperature ($T_{Lf0}$) is identified by reference numeral 24 in the same figure. As noted above, the temperature drop that results from the formation of grain nucleants in the aluminum alloy, which is identified generally by reference numeral 26 in FIG. 2 for purposes of illustration, does not factor into the calculation of the freezing range. To that end, the freezing range of the aluminum alloy may be calculated as the temperature difference between the temperature corresponding to a liquid fraction of 0.99 (solid fraction of 0.01) and the temperature corresponding to a liquid fraction of 0 (solid fraction of 1), as expressed in the following equation:

$$dT = (T_{Lf0.99} - T_{Lf0})$$

Applying this approach, the freezing range (dT) of the aluminum alloy is identified by reference numeral 28 in FIG. 2. Having calculated the CSC and the dT for the given aluminum alloy, the mCSC can be readily calculated by multiplying the CSC and dT values together, as described above.

It has been determined that an aluminum alloy having an mCSC of 70 or less is likely to be able to endure additive manufacturing without cracking under its own weight due to the thermal cycling that results from heating and cooling each successively-applied alloy microlayer added to the growing article. The mCSC of the disclosed precipitation hardenable aluminum alloy, including its low copper content and high copper content sub-variations, is less than 70 and, more specifically, is less than 60. Certain compositions of the precipitation hardenable aluminum alloy may even exhibit a mCSC of less than 40 or even less than 30. For example, the CSC, dT, and mCSC for several specific compositions of the disclosed precipitation hardenable aluminum alloy are shown below in Table 2.

TABLE 2

The mCSC of Various Aluminum Alloys

| Alloy | Composition (wt %) | $t_v/t_R$ | dT (° C.) | mCSC |
|---|---|---|---|---|
| A | Al—9Zn—3.5Mg—0.7Cu | 0.19 | 148 | 28.1 |
| B | Al—9Zn—2Mg—4Cu | 0.19 | 303 | 57.6 |
| C | Al—12Zn—3.5Mg | 0.19 | 178 | 33.8 |
| D | AA 7075 | 0.42 | 310 | 130.2 |
| E | AA 7050 | 0.26 | 308 | 80.1 |

As can be seen, the mCSC of the specific composition of the disclosed precipitation hardenable aluminum alloy, alloys A-C, are 28.2, 57.5, and 33.8, respectively. In comparison, the mCSC of some other conventional 7000 series aluminum alloys, Alloys D (AA 7075) and E (AA 7050), are 130.4 and 80.1, respectively. Each of AA 7075 and 7050 is known to be a poor candidate for additive manufacturing.

The precipitation hardenable aluminum alloy may be precipitation hardened to achieve a strength that is at least comparable to, and in many instances greater than, that of other conventional 7000 series aluminum alloys such as AA 7075 and AA 7050. The aluminum alloy may be precipitation hardened by a heat treatment process that includes solution treating the alloy, quenching the alloy, and aging the alloy. The heat treatment process, which results in the alloy having an aluminum matrix and a fine dispersion of precipitates throughout the aluminum matrix, may be conducted in such a way that the various precipitates include one or more strengthening phases selected from the η-phase precipitate, the θ-phase precipitate, and the T-phase precipitate. Specifically, the η-phase precipitate is $MgZn_2$, the θ-phase precipitate is $Al_2Cu$, and the T-phase precipitate is $Mg_3Zn_3Al_2$. Preferably, the phase fraction in mol % of the one or more strengthening precipitate phases in the precipitation hardened aluminum alloy is greater than 10% while the alloy is free of the S-phase precipitate, $Al_2CuMg$. The alloy is "free" of the S-phase precipitate when it has a phase fraction in mol % of the S-phase precipitate that is no greater than 0.2%.

Each of the η-phase precipitate, the θ-phase precipitate, the T-phase precipitate, and the S-phase precipitate is intended to broadly encompass the equilibrium form of the precipitate identified above as well as any metastable precursor precipitate forms that are associated with the equilibrium form. In particular, during aging, the aluminum alloy may progress through a precipitation sequence in which the supersaturated solid solution (SSS) is originally present followed by the development of Guinier-Preston (GP) zones, then one or more semi-coherent intermediate precipitate forms typically designated by a prime (') or double-prime (") of the phase identifier (e.g., η', θ', T'), and eventually the equilibrium form of the precipitate. Accordingly, each of the η-phase precipitate, the θ-phase precipitate, the T-phase precipitate, and the S-phase precipitate encompasses not only the equilibrium form of the precipitate, but also the GP zones and the semi-coherent intermediate precipitate forms of each precipitate phase. Indeed, at peak (T6 condition), 7000 series aluminum alloys are often primarily strengthened with GP zones and metastable semi-coherent intermediate precipitate forms that are nonetheless referred to collectively by those skilled in the art under the umbrella of their equilibrium form(s).

The heat treatment process that is employed to cultivate the precipitation hardened aluminum alloy may be performed after the aluminum alloy has been fabricated into an article of manufacture that has a specified three-dimensional profile. The heat treatment process begins by solution treating, or solutionizing, the precipitation hardenable aluminum alloy, which, as noted, may be in the form of a fabricated article. Solution heat treating the aluminum alloy includes heating the alloy to a temperature above its solvus temperature but below its solidus temperature to dissolve the constituent alloy elements and reduce any segregation to achieve a homogeneous solid solution of the alloy composition. Considering the composition of the disclosed precipitation hardenable aluminum alloy, the solution heat treating preferably involves heating the aluminum alloy to a temperature between 400° C. and 500° C. for time period of 15 minutes to 300 minutes (5 hours). After the solid solution of the alloy composition is attained, the aluminum alloy is quenched, which involves rapidly cooling the alloy to prevent the constituent alloy elements from diffusing to nucleation sites, thereby trapping the constituent alloy elements in solution and forming a supersaturated solution of the alloy composition. As applicable here, the aluminum alloy may be quenched by immediately exposing the alloy to a liquid or gas medium having a temperature below 100° C., preferably by immersing the alloy in water having a temperature between 25° C. and 100° C.

The supersaturated solution of the alloy composition is then aged to reject the constituent alloy elements out of solution and produce the finely divided precipitate within the aluminum matrix. The finely divided precipitate imparts the high strength qualities to the aluminum alloy by impeding dislocation movement and provide resistance to slip within the alloy. Aging may be natural or artificial. In artificial aging, the aluminum alloy with its supersaturated solution of the alloy composition is heated to a temperature below its solvus temperature to hasten the formation of the finely divided precipitate. Considering the composition of the disclosed precipitation hardenable aluminum alloy, the artificial aging preferably involves heating the alloy to a temperature between 100° C. and 200° C. for a time period of 3 hours to 48 hours. At the completion of aging and the development of the finely divided precipitate, the aluminum alloy is precipitation hardened as demonstrated by a yield strength of the alloy being greater as compared to a yield strength of the alloy prior to the heat treatment process.

Figure 3:
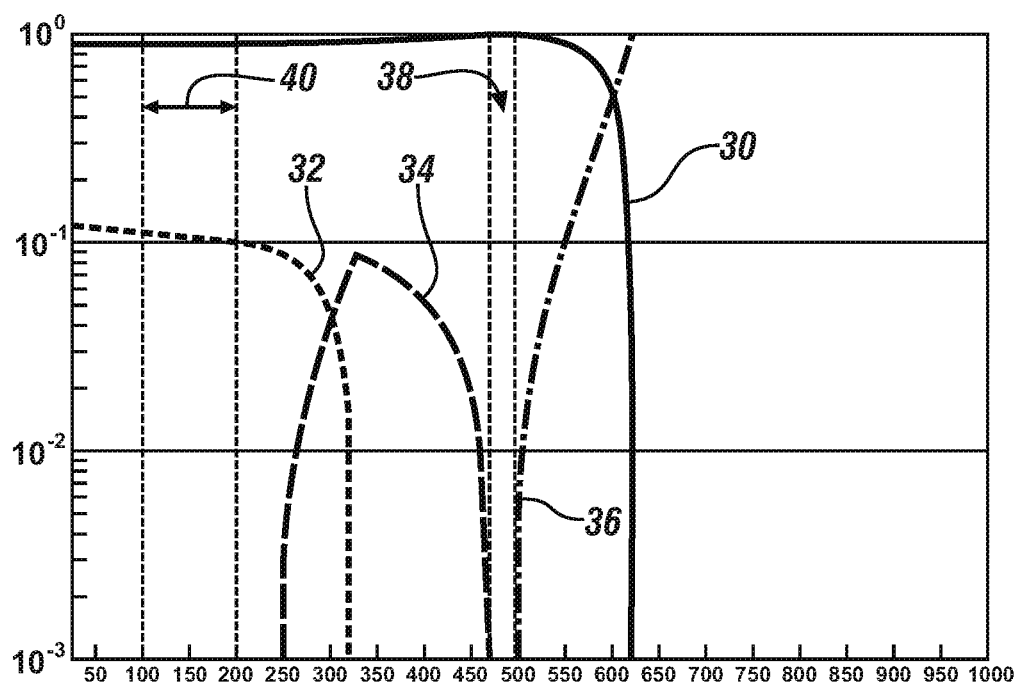
FIG. 3 is a step diagram for Al-9Zn-3.5Mg-0.7Cu (Alloy A in Tables 2 and 3) that depicts the molar phase fraction (x-axis) of the precipitate phases in the alloy on a logarithmic scale versus temperature (° C. in increments of 50° C. from 0° C. to 1000° C., y-axis), and wherein a phase fraction in mol % can be calculated from the step diagram by multiplying the molar phase fraction of each phase by 100.

The heat treatment process and, in particular, the solution heat treatment and the aging steps of the process, may be performed to promote the formation of the one or more strengthening precipitate phases (the η-, θ-, and T-phase precipitates) while avoiding S-phase precipitate. For example, and referring now to FIG. 3, a step diagram for Al-9Zn-3.5Mg-0.7Cu (Alloy A in Table 2) is shown that depicts the molar phase fraction of the precipitate phases in the alloy versus temperature. Here, in FIG. 3, the aluminum in FCC crystal unit structures is identified by reference numeral 30, the η-phase precipitate is identified by reference numeral 32, the T-phase precipitate is identified by reference numeral 34, and the liquid phase is identified by reference numeral 36. As such, the aluminum alloy of FIG. 3 may be solution treated at a temperature between 465° C. and 480° C. (reference numeral 38), quenched, and then artificially aged at a temperature between 100° C. and 200° C. (reference numeral 40) to produce a precipitation hardened aluminum alloy in which the finely divided precipitate is comprised of the η-phase precipitate and the T-phase precipitate while avoiding any S-phase precipitate. Moreover, a total phase fraction of 10 mol % or greater of the η-phase precipitate and the T-phase precipitate can be achieved in the precipitation hardened alloy.

Figure 4:
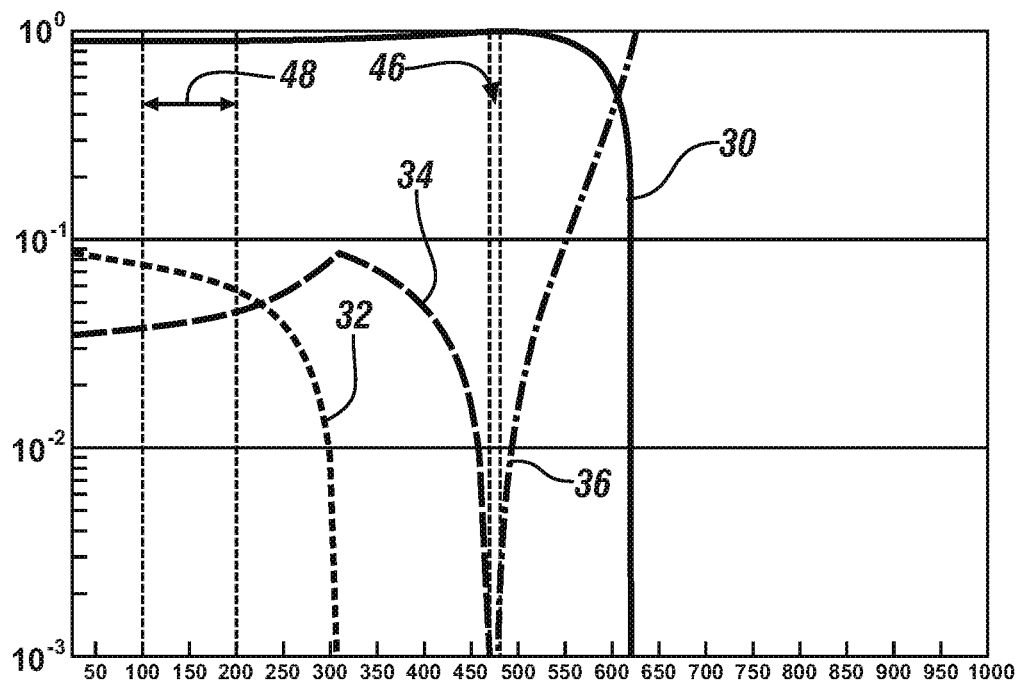
FIG. 4 is a step diagram for Al-9Zn-2Mg-4Cu (Alloy B in Tables 2 and 3) that depicts the phase fraction (x-axis) of the precipitate phases in the alloy on a logarithmic scale versus temperature (° C. in increments of 50° C. from 0° C. to 1000° C., y-axis), and wherein a phase fraction in mol % can be calculated from the step diagram by multiplying the molar phase fraction of each phase by 100.
Figure 5:
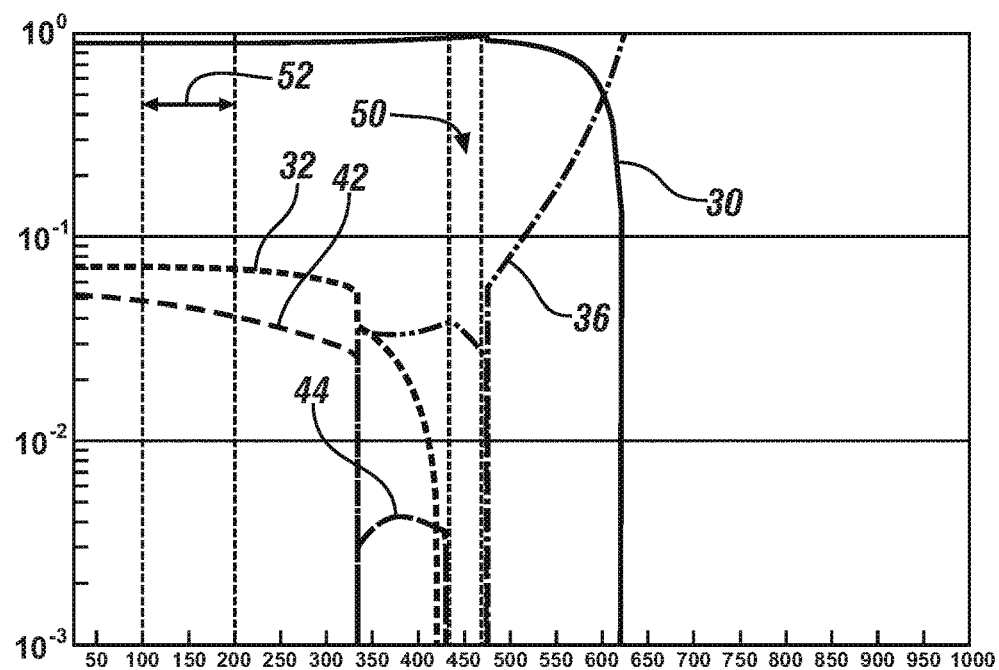
FIG. 5 is a step diagram for Al-12Zn-3.5Mg (Alloy C in Tables 2 and 3) that depicts the phase fraction (x-axis) of the precipitate phases in the alloy on a logarithmic scale versus temperature (° C. in increments of 50° C. from 0° C. to 1000° C., y-axis), and wherein a phase fraction in mol % can be calculated from the step diagram by multiplying the molar phase fraction of each phase by 100.

Similarly, in FIGS. 4 and 5, a step diagram for Al-9Zn-2Mg-4Cu (Alloy B in Table 2) and Al-12Zn-3.5Mg (Alloy C in Table 2) is shown that also depicts the molar phase fraction of the precipitate phases in the alloy versus temperature. In FIGS. 4 and 5, the aluminum in FCC crystal unit structures, η-phase precipitate, T-phase precipitate, and liquid phase are represented by the same reference numerals as before. The θ-phase precipitate is identified by reference numeral 42 and the S-phase precipitate is identified by reference numeral 44 (FIG. 4 only). As such, the aluminum alloy of FIG. 4 may be solution treated at a temperature between 440° C. and 470° C. (reference numeral 46), quenched, and artificially aged at a temperature between 100° C. and 200° C. (reference numeral 48) to produce a precipitation hardened aluminum alloy in which the finely divided precipitate is comprised of the η-phase precipitate and the θ-phase precipitate while avoiding any S-phase precipitate. In the same manner, the aluminum alloy of FIG. 5 may be solution treated at a temperature between 475° C. and 500° C. (reference numeral 50), quenched, and artificially aged at a temperature between 100° C. and 200° C. (reference numeral 52) to produce a precipitation hardened aluminum alloy in which the finely divided precipitate is comprised of the η-phase precipitate while avoiding any S-phase precipitate. In each case (FIG. 4 and FIG. 5), a total phase fraction of 10 mol % or greater of the η-phase precipitate and the θ-phase precipitate (FIG. 4), or the η-phase precipitate (FIG. 5), can be achieved in the precipitation hardened alloy.

The presence of the one or more strengthening precipitate phases in the finely dispersed precipitate combined with the lack of the S-phase precipitate—a condition made possible by the alloy composition of the precipitation hardenable aluminum alloy—is believed to be responsible for the notable strengths achieved in the precipitation hardened aluminum alloy. In particular, and referring again to the aluminum alloys of FIGS. 3-5, it can be seen that each of those alloys (Alloys A, B, and C in FIGS. 3, 4, and 5, respectively), when precipitation hardened, includes a total phase fraction of 10 mol % or greater of the one or more strengthening precipitate phase while being free from the S-phase precipitate. The specific precipitate phases present in each of Alloys A, B, and C are tabulated below in Table 3 along with their individual phase fractions and a total phase fraction for the alloy.

In comparison, the conventional 7000 series aluminum alloys noted above, AA 7075 and AA 7050, have a total phase fraction of less than 10 mol % and, in fact, the AA 7050 alloy includes some S-phase precipitate, which accounts for the discrepancy in the total phase fraction of that alloy in Table 3 since the S-phase precipitate is not separately itemized. In turn, the yield strength of Alloys A, B, and C, as determined indirectly by converting Vickers Hardness to yield strength, are notably greater than the reported yield strengths of AA 7075 and 7050.

As discussed above, the precipitation hardenable aluminum alloy may be fabricated into an article followed by heat treating the article as described to precipitation harden the alloy. The precipitation hardenable aluminum alloy is particularly well-suited to be fabricated into an article having a three-dimensional shape, such as a compressor wheel for a turbocharger of a supercharger, by additive manufacturing. The additive manufacturing process involves fusing a plurality of microlayers of the precipitation hardenable alloy together in succession to ultimately build the article microlayer by microlayer. Each of the microlayers range in thickness from 5 μm to 100 μm or, more narrowly from 10 μm to 50 μm, and may be fused together by sintering or melting the microlayers of the alloy together using a concentrated energy beam, which, typically, is a laser beam or an electron beam. Many variations of additive manufacturing exist including powder bed fusion techniques and direct energy deposition techniques. Several notable versions of powder bed fusion techniques include selective laser sintering (SLS), selective laser melting (SLM), and electron beam melting (EBM). A notable version of direct energy deposition includes laser engineered net shaping (LENS). Each of these additive manufacturing variations is known in the art its equipment requirements and operation are known and understood by those skilled in the art.

Figure 6:
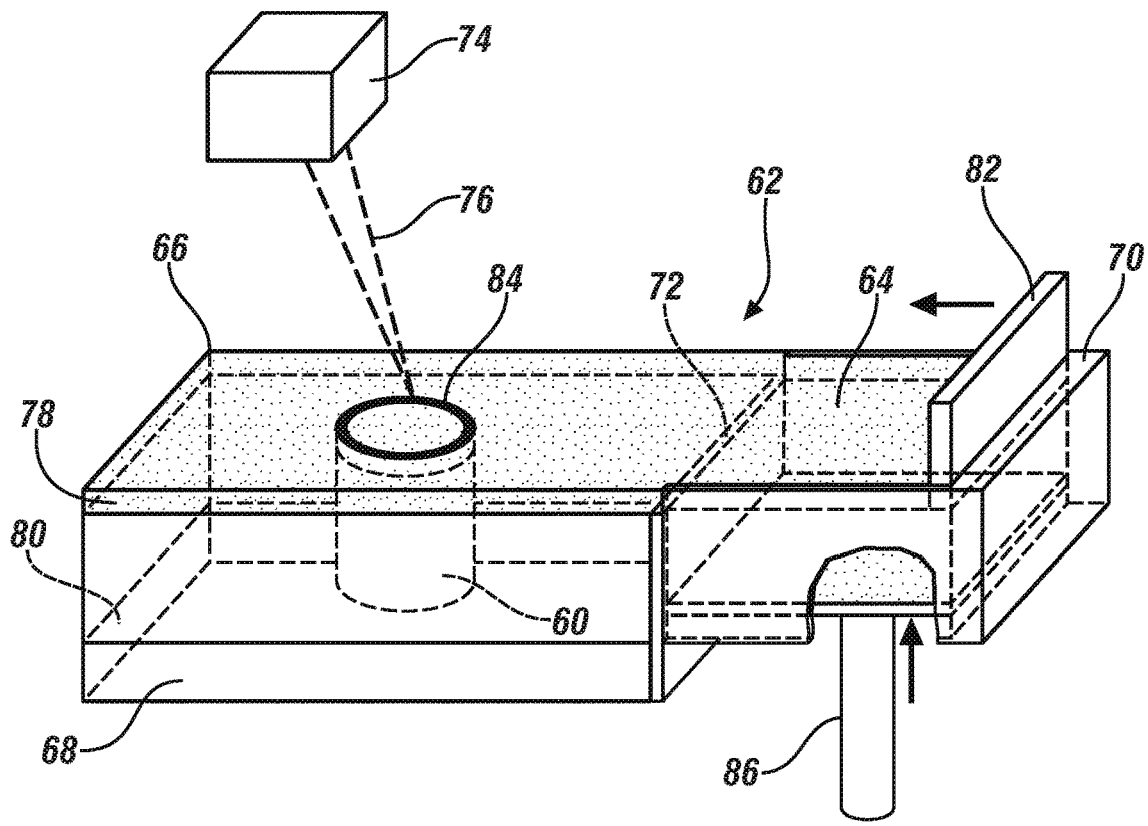
FIG. 6 is a general illustration of an apparatus for manufacturing an aluminum alloy article from the precipitation hardenable aluminum alloy of the present disclosure by powder bed fusion additive manufacturing.

An illustration of a powder bed fusion process for fabricating an aluminum alloy article 60 is shown in FIG. 6 as an example of a suitable additive manufacturing approach. There, powder bed fusion apparatus 62 is shown that can be used to build the three-dimensional aluminum alloy article 60 microlayer by microlayer from a powder collection 64 of the presently-disclosed precipitation hardenable aluminum alloy using digital design data. The powder bed fusion apparatus 62 includes a printing chamber 66 that surrounds a build plate 68, a powder feed reservoir 70 separated from the printing chamber by a weir 72 that contains the powder collection 64, and an energy source 74 that can direct a concentrated energy beam 76 such as a laser beam (SLS,

TABLE 3

Precipitate Phases and Yield Strengths of Various Aluminum Alloys

| Alloy | Composition (wt %) | Phase Fraction (mol %) at 120° C. | | | | Vickers Hardness (HT) | Yield Strength (MPa) |
| --- | --- | --- | --- | --- | --- | --- | --- |
| | | η-phase | θ-phase | T-phase | Total | | |
| A | Al—9Zn—3.5Mg—0.7Cu | 6.90 | 0.0 | 4.16 | 11.06 | 208-210 | 579-627 |
| B | Al—9Zn—2Mg—4Cu | 7.17 | 4.80 | 0.0 | 11.97 | 205-208 | 583-630 |
| C | Al—12Zn—3.5Mg | 10.55 | 0.0 | 0.0 | 10.55 | 205-211 | 585-633 |
| D | AA 7075 | 4.62 | 0.0 | 3.94 | 8.56 | N/A | 503 |
| E | AA 7050 | 6.06 | 0.0 | 0.05 | 8.58 | N/A | 490 |

SLM) or an electron beam (EBM). The powder of the precipitation hardenable aluminum alloy may include alloy particles having a particle size as measured along the largest dimension of the particles that ranges from 5 μm to 100 μm or, more narrowly, from 20 μm to 65 μm. The alloy particles are preferably spherical in shape but are not necessarily limited to such a geometry. Any suitable process may be employed to derive the precipitation hardenable aluminum alloy in powder form including, but not limited to, gas atomization.

The powder bed fusion process involves repeatedly performing a spreading a microlayer fusion cycle. This cycle involves first spreading a powder layer 78 of the precipitation hardenable aluminum alloy powder over a build surface 80 of the build plate 68. This is accomplished by sliding the blade 82 through the powder feed reservoir 70 and across the build plate 68 to deposit the powder layer 78 directly onto the build surface 80 or onto a portion of the article 60 (as shown) that is being built onto and upwardly from the build surface 80. The deposited powder layer 78 has a thickness that is generally the same as the microlayers being fused together during the building of the aluminum alloy article 60; that is, a thickness ranging from 5 μm to 100 μm or, more narrowly from 10 μm to 50 μm. Next, after the powder layer 78 has been deposited, the concentrated energy beam 76 scans a two-dimensional pattern projected onto the powder layer 78 to sinter or melt a predetermined portion 84 of the powder layer 78 that corresponds to the cross-sectional slice of the aluminum alloy part 60 being formed and added during the cycle. After the concentrated energy beam 76 is finished scanning the powder layer 78, the sintered or melted portion 84 of the powder layer 78 rapidly cools and solidifies into a fused microlayer, thereby completing the microlayer fusion cycle.

The microlayer fusion cycle is repeated many times—often on the order of hundreds to thousands to tens of thousands of times—to build the aluminum alloy article 60 onto the build surface 80 of the build plate 68. The first microlayer fusion cycle forms the first microlayer of the aluminum alloy part 60 and each successively completed microlayer fusion cycle fuses another, single microlayer onto the previously fused microlayer until the article is fully fabricated. To accommodate the deposition of successive powder layers 78 and the growing aluminum alloy article 60, the powder feed reservoir 70 may be equipped with a dosing piston 86 that incrementally raises the reservoir 70 after each microlayer fusion cycle relative to the printing chamber 66 so that the next powder layer 78 can be deposited over the fused microlayer obtained from the previously-deposited powder layer 78. After the aluminum alloy article 60 is fully fabricated in the printing chamber 66, the article is removed from the surrounding excess powder. The article 60, which is now a shaped monolith constructed from the precipitation hardenable aluminum alloy, may subjected to the heat treatment process described above to precipitation harden the precipitation hardenable aluminum alloy. In some instances, the aluminum alloy article may be annealed at a temperature between 100° C. and 300° C. for a time period of 2 hours to 6 hours to relieve residual thermal stresses prior to the heat treatment process, particularly if the microlayers do not solidify fast enough during additive manufacturing.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A precipitation hardenable aluminum alloy having a composition comprising:
    12.1 wt % to 12.5 wt % zinc;
    3 wt % to 4 wt % magnesium;
    0.4 wt % to 1.0 wt % copper;
    0.01 wt % to 0.5 wt % zirconium, chromium, or zirconium and chromium in total; and
    balance aluminum with no more than 0.2 wt % impurities.

2. The precipitation hardenable aluminum alloy set forth in claim 1, wherein the aluminum alloy has a modified cracking susceptibility coefficient (mCSC) of 70 or less, and wherein the modified cracking susceptibility coefficient is defined by equation (1)

$$mCSC = (CSC)(dT) \tag{1}$$

wherein CSC is a standard cracking coefficient of the aluminum alloy and dT is a freezing range of the aluminum alloy, the CSC being further defined by equation (2)

$$CSC = \frac{(t'_{Lf0.01} - t'_{Lf0.1})}{(t'_{Lf0.1} - t'_{Lf0.6})} \tag{2}$$

wherein, in relation to the aluminum alloy solidifying from 100% liquid to 100% solid as depicted on a liquid fraction versus time fraction curve, $t'_{Lf0.01}$ is a time fraction associated with a liquid fraction of 0.01, $t'_{Lf0.1}$ is a time fraction associated with a liquid fraction of 0.1, and $t'_{Lf0.6}$ is a time fraction associated with a liquid fraction of 0.6, and dT being further defined as a difference between a temperature at which aluminum atoms begin to assemble into their primary face centered cubic (FCC) crystal unit cell structures and a temperature at which there is no more liquid remaining in the aluminum alloy, the dT being reported in degrees Celsius.

3. The precipitation hardenable aluminum alloy set forth in claim 2, wherein the mCSC of the aluminum alloy is less than 60.

4. The precipitation hardenable aluminum alloy set forth in claim 2, wherein the mCSC of the aluminum alloy is less than 40.

5. The precipitation hardenable aluminum alloy set forth in claim 2, wherein the mCSC of the aluminum alloy is less than 30.

6. The precipitation hardenable aluminum alloy set forth in claim 1, wherein the composition of the precipitation hardenable aluminum alloy comprises:
    0.01 wt % to 0.3 wt % zirconium, chromium, or zirconium and chromium in total; and
    no more than 0.1 wt % impurities.

7. A precipitation hardened aluminum alloy having a composition comprising:
    12.1 wt % to 12.5 wt % zinc;
    3 wt % to 4 wt % magnesium;
    0.4 wt % to 1.0 wt % copper;
    0.01 wt % to 0.5 wt % zirconium, chromium, or zirconium and chromium in total; and
    balance aluminum with no more than 0.2 wt % impurities,
    wherein the alloy includes an aluminum matrix and a fine dispersion of precipitates within the aluminum matrix, the fine dispersion of precipitates including one or more strengthening precipitate phases selected from an η-phase precipitate, a θ-phase precipitate, and a T-phase precipitate, while being free of a S-phase precipitate.

8. The precipitation hardened aluminum alloy set forth in claim 7, wherein a phase fraction of the one or more strengthening precipitate phases in the alloy is greater than 10 mol %.

9. The precipitation hardened aluminum alloy set forth in claim 8, wherein the fine dispersion of precipitates includes the η-phase precipitate and a phase fraction of the η-phase precipitate in the alloy is greater than 10 mol %, or wherein the fine dispersion of precipitates includes the η-phase precipitate and the θ-phase precipitate and a phase fraction of the η-phase precipitate and the θ-phase precipitate in combination in the alloy is greater than 10 mol %, or wherein the fine dispersion of precipitates includes the η-phase precipitate and the T-phase precipitate and a phase fraction of the η-phase precipitate and the T-phase precipitate in combination in the alloy is greater than 10 mol %.

10. The precipitation hardened aluminum alloy set forth in claim 7, wherein the aluminum alloy has a modified cracking susceptibility coefficient (mCSC) of 70 or less, and wherein the modified cracking susceptibility coefficient is defined by equation (1)

$$mCSC = (CSC)(dT) \quad (1)$$

wherein CSC is a standard cracking coefficient of the aluminum alloy and dT is a freezing range of the aluminum alloy, the CSC being further defined by equation (2)

$$CSC = \frac{(t'_{Lf0.01} - t'_{Lf0.1})}{(t'_{Lf0.1} - t'_{Lf0.6})} \quad (2)$$

wherein, in relation to the aluminum alloy solidifying from 100% liquid to 100% solid as depicted on a liquid fraction versus time fraction curve, $t'_{Lf0.01}$ is a time fraction associated with a liquid fraction of 0.01, $t'_{Lf0.1}$ is a time fraction associated with a liquid fraction of 0.1, and $t'_{Lf0.6}$ is a time fraction associated with a liquid fraction of 0.6, and dT being further defined as a difference between a temperature at which aluminum atoms begin to assemble into their primary face centered cubic (FCC) crystal unit cell structures and a temperature at which there is no more liquid remaining in the aluminum alloy, the dT being reported in degrees Celsius.

11. The precipitation hardened aluminum alloy set forth in claim 10, wherein the mCSC of the alloy is less than 70.

12. The precipitation hardened aluminum alloy set forth in claim 11, wherein the mCSC of the alloy is less than 30.

13. An aluminum alloy comprising:
   12.1 wt % to 12.5 wt % zinc;
   3 wt % to 4 wt % magnesium;
   0.4 wt % to 1.0 wt % copper;
   0.01 wt % to 0.5 wt % zirconium and/or chromium; and
   balance aluminum with no more than 0.2 wt % impurities,
   wherein the aluminum alloy is configured to be precipitation hardened in a heat treatment process to include an aluminum matrix and a dispersion of precipitates throughout the aluminum matrix, the dispersion of precipitates including an η-phase precipitate, a θ-phase precipitate, and a T-phase precipitate.

14. The aluminum alloy set forth in claim 13, wherein the η-phase precipitate is $MgZn_2$, the θ-phase precipitate is $Al_2Cu$, and the T-phase precipitate is $Mg_3Zn_3Al_2$.

15. The aluminum alloy set forth in claim 14, wherein the η-phase precipitate and the T-phase precipitate have a total phase fraction of 10 mol % or greater, and wherein the dispersion of precipitates has no S-phase precipitate or an S-phase precipitate with a phase fraction in mol % of no greater than 0.2%.

16. The aluminum alloy set forth in claim 14, wherein the η-phase precipitate and the θ-phase precipitate have a total phase fraction of 10 mol % or greater, and wherein the dispersion of precipitates has no S-phase precipitate or an S-phase precipitate with a phase fraction in mol % of no greater than 0.2%.

17. The precipitation hardenable aluminum alloy set forth in claim 1, wherein the composition comprises 0.5 wt % to 1.0 wt % copper.

18. The precipitation hardened aluminum alloy set forth in claim 1, wherein the composition comprises 0.7 wt % copper.

19. The precipitation hardenable aluminum alloy set forth in claim 1, wherein the composition comprises 0.1 to 0.5 wt % zirconium, chromium, or zirconium and chromium.

* * * * *